US008291567B1

(12) United States Patent
Keenan et al.

(10) Patent No.: US 8,291,567 B1
(45) Date of Patent: Oct. 23, 2012

(54) METHOD FOR MAXIMIZING PACKING DENSITY WITH CYLINDRICAL OBJECTS IN CYLINDRICAL CAVITIES

(75) Inventors: Timothy James Keenan, San Diego, CA (US); Joshua Bianchi, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 239 days.

(21) Appl. No.: 12/868,125

(22) Filed: Aug. 25, 2010

(51) Int. Cl.
*B21D 53/00* (2006.01)
*G06F 19/00* (2011.01)
*B65D 81/00* (2006.01)

(52) U.S. Cl. ...... 29/407.09; 29/407.1; 700/98; 700/119; 703/1; 206/703; 429/100

(58) Field of Classification Search ........... 29/2, 407.01, 29/407.05, 407.09, 407.1; 700/98, 119; 429/99, 429/100; 703/1; 206/203, 703, 704, 705
See application file for complete search history.

(56) References Cited

U.S. PATENT DOCUMENTS

| | | | |
|---|---|---|---|
| 3,584,758 A | 6/1971 | Moore |
| 4,020,244 A | 4/1977 | Selinko |
| 4,091,187 A | 5/1978 | Kaye |
| 4,123,598 A | 10/1978 | Hammel |
| 4,161,568 A | 7/1979 | Lund |
| 4,510,215 A | 4/1985 | Adam |
| 5,308,717 A | 5/1994 | Gordin |
| D372,701 S | 8/1996 | Tahmassebpur |
| 5,948,556 A | 9/1999 | Hall |
| 5,981,101 A | 11/1999 | Stone |
| 6,033,800 A | 3/2000 | Ichiyanagi |
| 6,040,080 A | 3/2000 | Minami |
| 6,051,336 A | 4/2000 | Dougherty |
| D437,579 S | 2/2001 | Toops |
| 6,400,122 B1 | 6/2002 | Iwamura |
| 6,558,835 B1 | 5/2003 | Kurisu |
| 6,641,951 B1 | 11/2003 | Vutetakis |
| 7,128,219 B2 | 10/2006 | Marraffa |
| 7,291,421 B2 | 11/2007 | Kimura |
| 7,368,201 B1 | 5/2008 | Druelle |
| 7,397,218 B2 | 7/2008 | Rejman |
| 7,473,194 B2 | 1/2009 | Nardacci |
| 7,480,594 B2 | 1/2009 | Sugihara |
| D608,283 S | 1/2010 | Mack |
| 2009/0148754 A1 | 6/2009 | Matchio |

OTHER PUBLICATIONS

Gi-Heon Kim et al, "Thermal Management of Batteries in Advanced Vehicles Using Phase-Change Materials", The World Electric Vehicle Journal, vol. 2, Issue 2 (2008).
Commercial Brochure (undated) entitled "Need an Ice Cube to Cool Your Battery Pack?" from AllCell Technologies LLC, Chicago, IL.
Non-published patent application entitled Device for Maximizing Packing Density With Cylindrical Objects in Cylindrical Cavities, U.S. Appl. No. 12/822,283, filed Jun. 24, 2010, Keenan, Timothy et al.

*Primary Examiner* — Jermie Cozart
(74) *Attorney, Agent, or Firm* — Kyle Eppele; Stephen E. Baldwin

(57) ABSTRACT

In one embodiment, the present invention provides a method for forming battery tray for holding cylindrical cell batteries. The method includes forming a battery try including a base support having a generally flat bottom surface and multiple adjacent cylindrical cavities are formed within the base support, using a circle packing algorithm to form the cylindrical cavities. The adjacent cavities each have at least some interstitial cylindrical riser wall structures formed with a predetermined height to hold the cylindrical cell batteries. In another embodiment, the present invention allows for packing maximum energy density per layer. This allows lifetime and power output of a battery powered device to be optimized and/or increased.

18 Claims, 21 Drawing Sheets

36 circles in the unit circle radius = 0.148219429761   density = 0.790883976914
ratio = 6.746753793424    contacts = 66

EXPLODED ASSEMBLY

ASSEMBLY

CIRCLE PACKING THEORY (37 CELLS)

HEXAGONAL PACKING

SQUARE PACKING

SQUARE PACKING
With Oversized Holes for Easy Part Removal

CIRCLE PACKING GREYSCALE SHADED ISOMETRIC VIEW (32 CELLS)

RADIAL PACKING (160 CELLS)

DIFFERENT DIAMETERS

DIFFERENT GEOMETRIC SHAPES

METHOD FOR MAXIMIZING PACKING DENSITY WITH CYLINDRICAL OBJECTS IN CYLINDRICAL CAVITIES

FEDERALLY-SPONSORED RESEARCH AND DEVELOPMENT

This invention (Navy Case No. 100,190) is assigned to the United States Government and is available for licensing for commercial purposes.

CROSS-REFERENCE TO RELATED APPLICATIONS

The present application is related to patent application Ser. No. 12/822,283, filed Jun. 24, 2010, which is still pending and entitled Device For Maximizing Packing Density With Cylindrical Objects In Cylindrical Cavities (Navy Case No. 100, 190), assigned to the same assignee as the present application, the details of which are hereby incorporated by reference.

BACKGROUND

Current devices for holding cylindrical objects such as cell batteries do not allow for maximum packing. Common approaches for such packing are that the batteries are glued to one another in rows, symmetrically arranged from a center point, or a hexagonal arrangement. The limitation of these approaches is that one cannot implement an optimized packing theory because of the complex configurations and therefore, maximum energy density cannot be achieved.

SUMMARY

In one preferred embodiment, the present invention provides a method for forming a battery tray for holding cylindrical cell batteries. The method includes forming a battery tray including a base support having a generally flat bottom surface and multiple adjacent cylindrical cavities are formed within the base support, using a circle packing algorithm to form the cylindrical cavities. The adjacent cavities each have at least some interstitial cylindrical riser wall structures formed with a predetermined height to hold the cylindrical cell batteries in the desired arrangement.

BRIEF DESCRIPTION OF THE DRAWINGS

Throughout the several views, like elements are referenced using like references, wherein.

DETAILED DESCRIPTION OF THE EMBODIMENTS

One purpose of the present invention is to provide a cell battery configuration, utilizing a method for repeatable manufacture that maximizes energy density in, for example, cylindrical, rectangular or other types of enclosures.

As described above, current devices for holding cylindrical objects such as cell batteries do not allow for maximum packing. The limitation of these approaches is that one cannot implement an optimized packing theory because of the complex configurations and therefore, maximum energy density cannot be achieved.

Using an optimized packing theory, there are very concise coordinates for placement of each battery that cannot be achieved by previous methods. Examples of optimized packing theory include the Circle Packing theorem (aka Koebe-Andreev-Thurston theorem), which describes the possible tangency relations between circles in the plane whose interiors are disjointed. Another algorithm which optimizes a point set is a Voronoi diagram, which when a set of points is defined, partitioning of the plane is made into regions of equal nearest neighbor. Also Soddy Circle theory, a.k.a. kissing circles, and the Descartes Theorem may be used to generate a pattern of points based on the vertices of each triangle derived from the mutual tangency of circles.

An overview of a preferred method for implementing the present invention for a cylindrical enclosure will first be described.

First, define the maximum inner diameter of the cylindrical enclosure (i.e. battery housing). Next, define the type and size of cylinders to be packed in the enclosure. (i.e. size D alkaline batteries, as an example)

Using a suitable circle packing algorithm (circle packing-theory), determine the maximum amount of cylinders that can fit in the enclosure per layer (i.e. maximum number of size D alkaline batteries per layer). Using a circle packing-theory, determine the coordinates of each cylinder, referenced to the enclosure (i.e. (Cartesian (x and y) coordinates of each battery from the center point of the enclosure in a 2D view).

Figure 1:
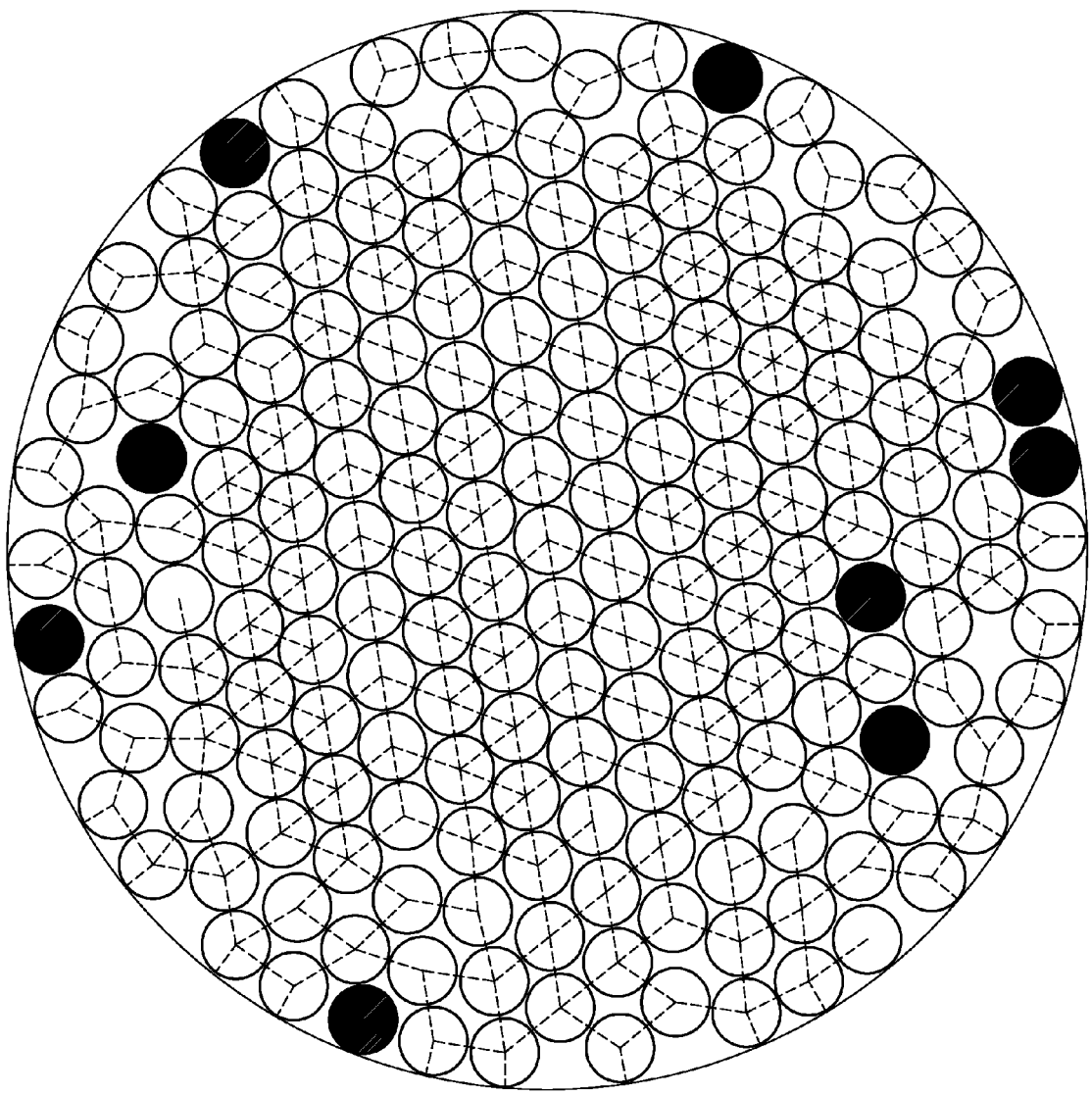
FIG. 1 shows circle arrangements using circle packing theory with 192 circles.
Figure 2:
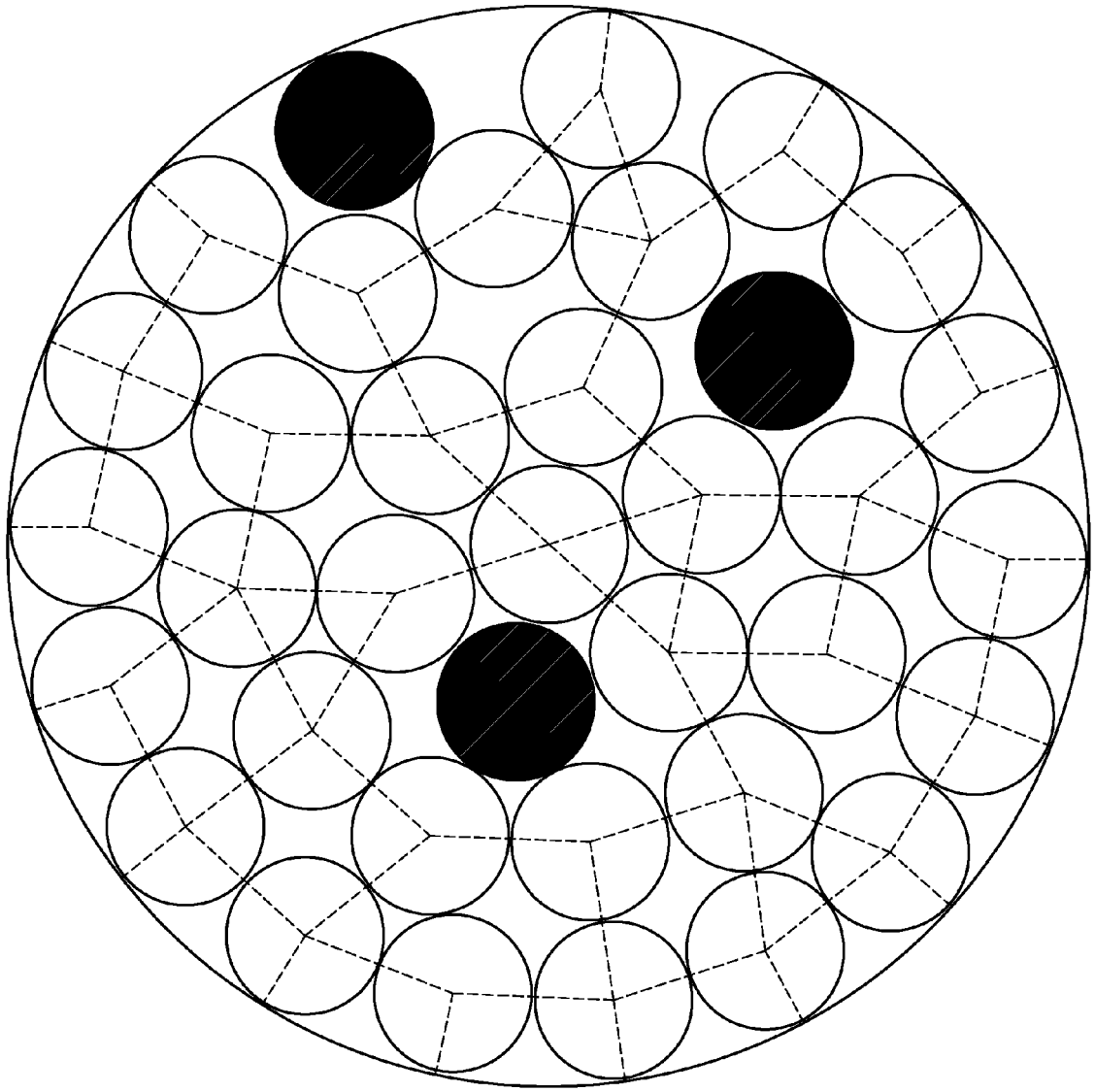
FIG. 2 shows circle arrangements using circle packing theory with 36 circles.

As examples, FIG. 1 shows circle arrangements using a circle packing theory with 192 circles (with the designator indicia radius=0.659, ratio=15.169, density=0.834, and contacts=384). FIG. 2 shows circle arrangements with 36 circles (with radius=0.148, ratio=6.747, density=0.791, contacts=66). The shaded portions of each circle in FIGS. 1 and 2 represent how many other circles are directly contacting.

The large container circle area shown in FIGS. 1 and 2 would be a unit value of R=1, where the "radius" designates the radius of each circle within the unit circle; the "ratio" designates R/r between the radius of the container circle R(=1) and the radius of the small circles; "density" is the ratio of the total area occupied by the smaller circles with respect to the container area; and "contacts" designates the number of tangential contacts between the small circles and the container circle, and between the small circles themselves, respectively.

Figure 3:
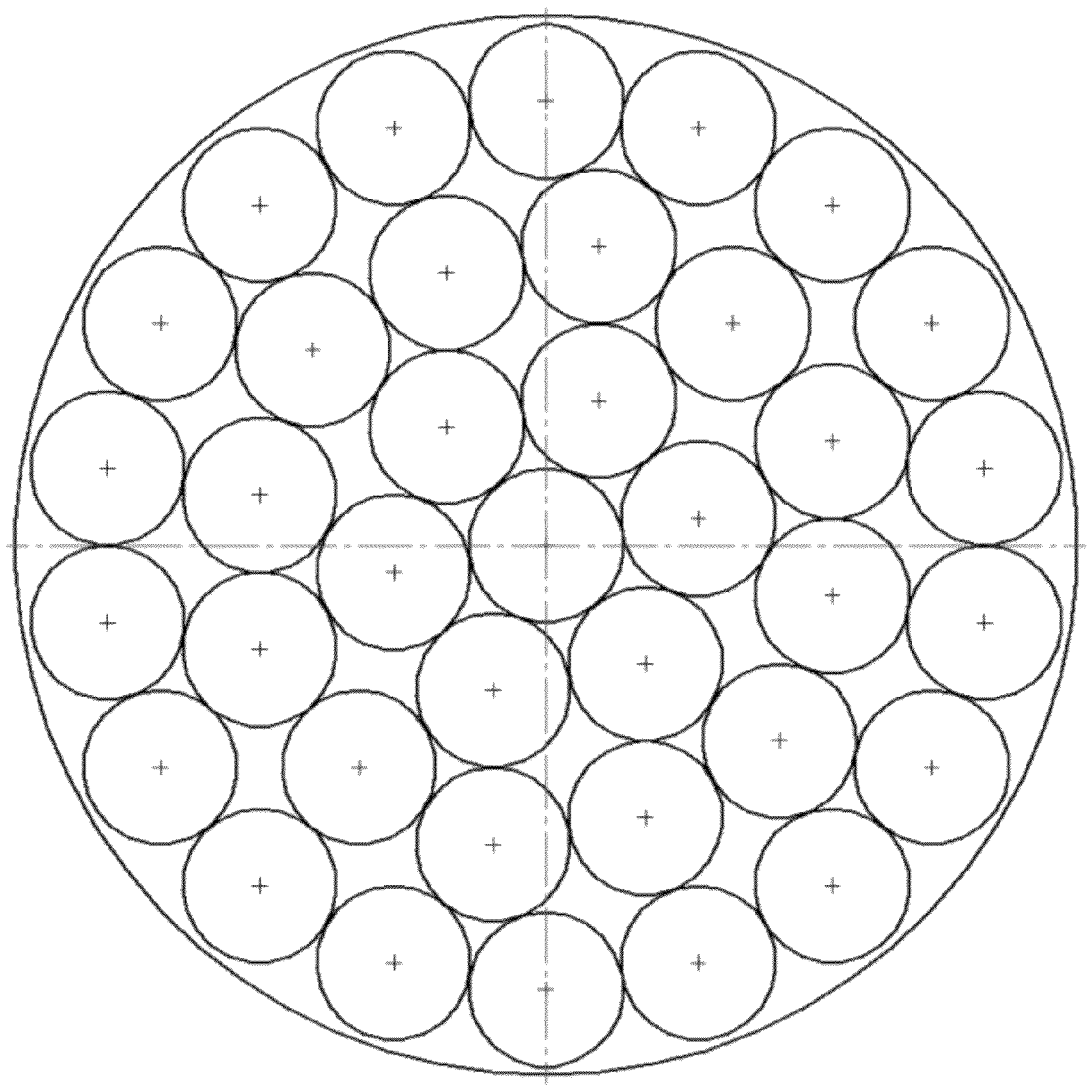
FIG. 3 shows a CAD sketch of point cloud and cell arrangement for 37 cells.

Using CAD (computer aided design) software, enter the center coordinates of each cylinder as the origin for cylindrical cutouts in a larger part which will serve to contain the cylinders (i.e. create cutouts in a cylindrical part where each battery can be placed for manufacture). These coordinate points can be automatically populated on a desired plane in the software from an established data set derived from a packing theory or manually entered on a plane. FIG. 3 shows a CAD sketch of point cloud and cell arrangement for 37 cells.

Figure 4B:
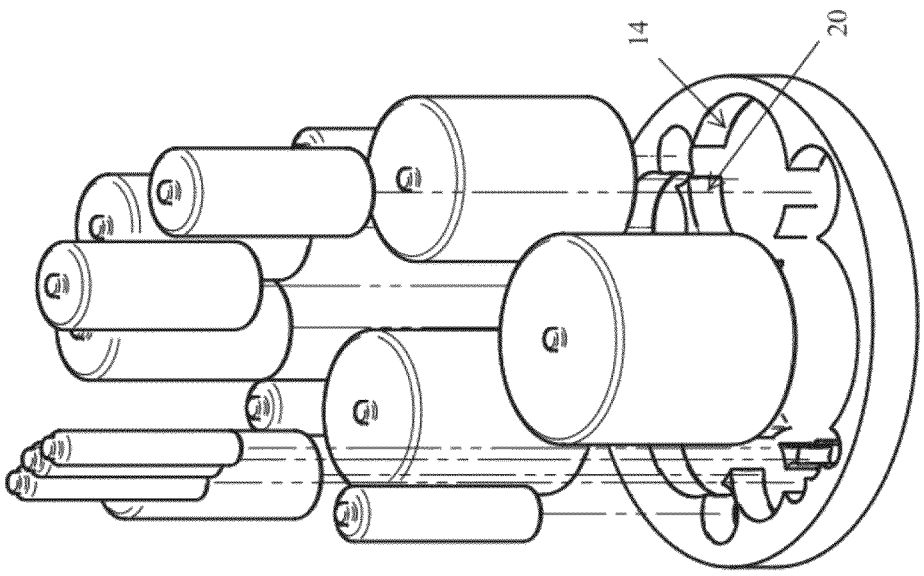
FIGS. 4A and 4B show a perspective view of a cell battery tray of the present invention.
Figure 4A:
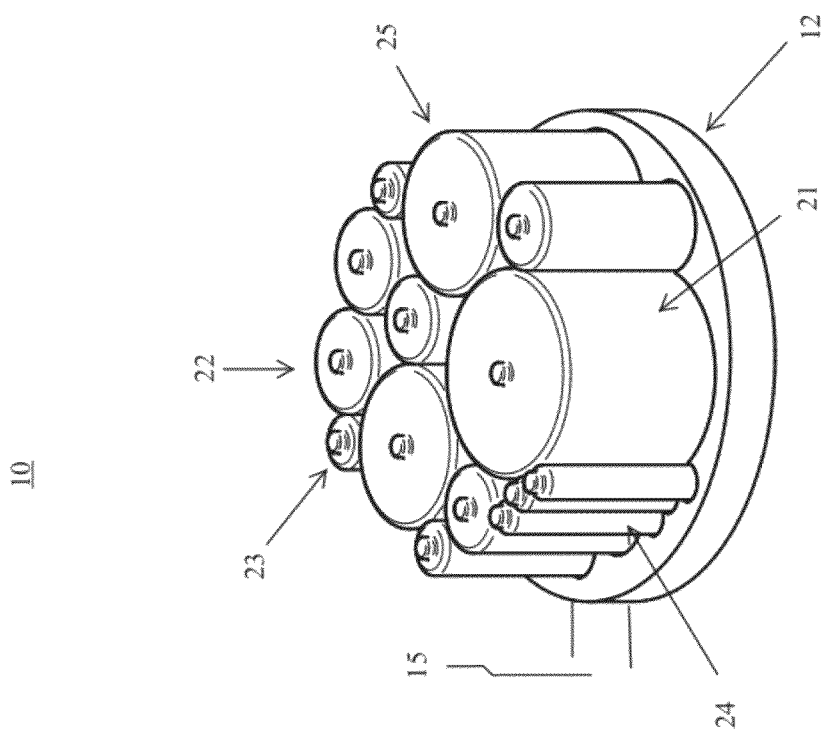

Next, print the designed tray on a 3D plastic printer or other suitable configuration, such as stereolithography. FIGS. 4A and 4B show a battery tray for a 32 battery cell arrangement in a circular cylinder, utilizing one preferred method as described above.

For a manufacturing jig, the next step could be to place the cylinders in the jig for repeatable manufacture (i.e. place the batteries in the jig). Then, weld/wire batteries as the design requires. Either remove the jig from pack configuration or use as designed-in fixture to stabilize and add structural integrity to pack, or dielectric spacing.

In one embodiment, the present invention allows for packing maximum energy density per layer. This allows energy and power output of a battery powered device to be optimized and/or increased. This could also create smaller battery-pack sizes for products if users chose to minimize space and maintain a threshold of available energy. It also provides means to produce form fitting surrounding structures for mechanical support of arranged cylinders of batteries.

As described above, the present invention could be used as a manufacturing fixture or a structural component or both.

In one embodiment, the present invention provides a device for holding cylindrical objects in cylindrical cavities, using a circle packing algorithm. FIGS. 4A and 4b show an assembly view and an exploded assembly view, respectively, of an embodiment of the present invention suitable as a battery tray for holding multiple battery cells, such as size various size battery cells. The battery tray 10 shown in FIG. 4A is cylindrical in shape and is nine inches in diameter. The tray 10 can hold different sizes of battery cells, such as battery 21 ("D" battery), battery 22 ("B" battery), battery 23 ("A" battery), battery 24 ("AAA" battery), and battery 25 ("C" battery). It should be apparent that other configurations of battery 10 are possible.

The battery tray 10 shown in FIGS. 4A and 4B has a base support 12 which has a circular configuration and has a generally flat exterior bottom surface (not shown in the FIG. 4 view). It can be seen in FIG. 4B that a plurality of cylindrical cavities 14 are formed within the base support 12, utilizing a circle packing algorithm as described above and in more detail in the cross-referenced application, also identified above.

A selected circle packing algorithm allows the formation of the maximum number of cavities 14 within the base support 12. Generally, circle packing as utilized with the present invention is an arrangement of cylindrical cavities inside a given boundary such that no two cylindrical cavities overlap and some (or all) of adjacent cylindrical cavities may be mutually tangent with one another.

In FIGS. 4A and 4B, each of the cylindrical cavities 14 are shown with equal diameters within the base structure, for the purpose of holding "D" cell size batteries. However, other embodiments could have cylindrical cavities with different diameters, such as for holding "A", "AA", "AAA", "B", "C", and/or "D" size cell batteries, or any combination of sizes, as desired.

The base support 12 shown in FIG. 4 has adjacent cavities 14 which form interior circular support wall structures 20 of a predetermined height 15 to support the cell batteries. In some instances, only a portion of the circular walls are tangential with one another. This is because of the geometrical configurations possible dictated by the circle packing algorithms used, as described above.

FIGS. 4A and 4B show that that the interior adjacent cylindrical cavities 14 form interstitial circular walls 20 (or "interstitial risers 20") which are geometrically formed by arcs of adjacent cavities, some of which are tangential. Stated another way, each of the interstitial circular wall structures are geometrically formed by at least some arc surfaces of adjacent tangential cavities.

Figure 5:
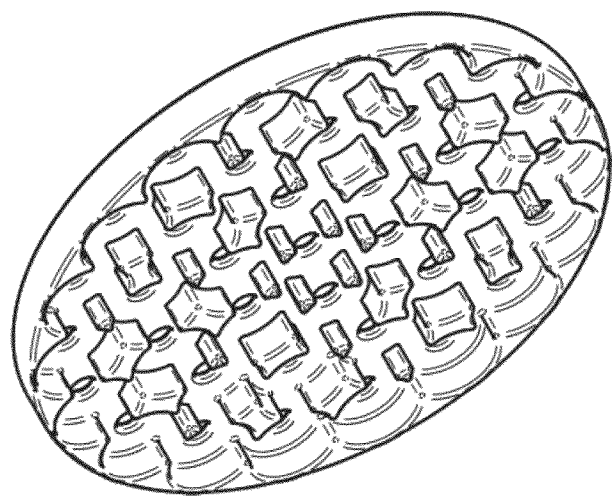
FIG. 5 shows front, perspective and cross-sectional side views of a circular packing embodiment.
Figure 5:
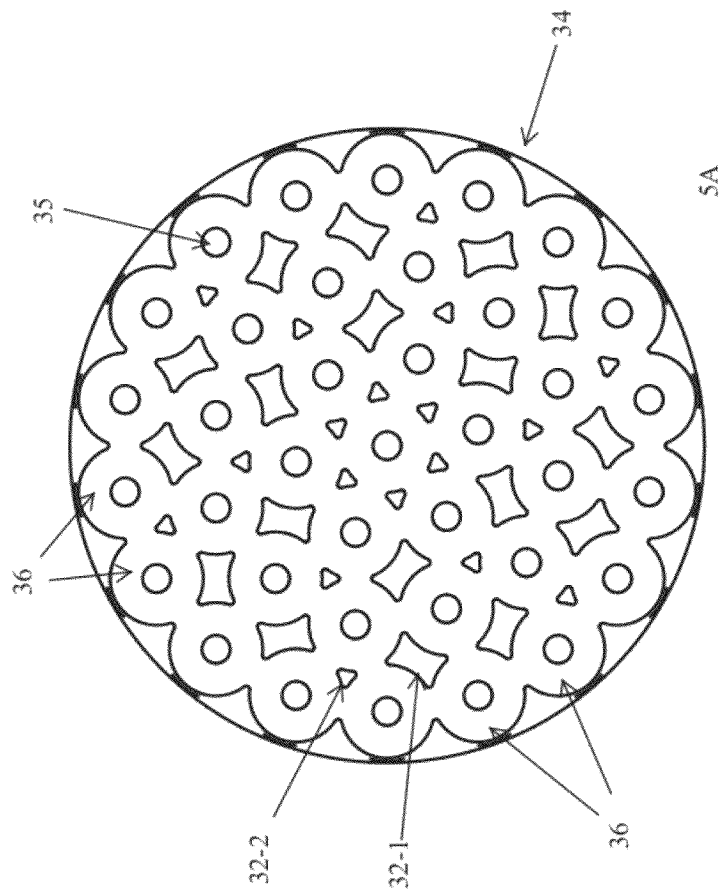
Figure 5:

FIGS. 5A-5C show an embodiment of the present invention for a battery tray 30 using a circle packing theory for 37 battery cells. It can be seen in FIG. 5 that the interstitial risers 32 have different geometrical shapes, such as risers 32-1, 32-2. This is because of the utilization of the selected circle packing algorithm, which provides for a maximum density within base support 34. The bottom of base 34 has an arrangement of holes or openings 35, which can accommodate the positive battery terminals of a cell battery. The end result is a battery tray 30 which includes a plurality of cylindrical cavities 36 which provide support for corresponding cell batteries.

In FIG. 5, the interstitial risers 32 are formed by the respective tangential cylindrical arc sections according to the selected circle packing theorem. The interstitial risers 32 have varying shapes, such as in the form of a generally triangular prism riser 32-2 (with slight curvature). Another shape of riser 32 seen in FIG. 5 is riser 32-1, which is formed by four different cylindrical arc sections. As would be understood, the interstitial risers 32 form a cylindrical surface support structure which effectively provides support for a respective cell battery.

The cell battery trays shown in FIGS. 4A-8 can be manufactured with a base support of a predetermined height for holding the cell batteries. In one suitable usage for storage, shipment and display, the cell battery tray could be further sealed, such as with a shrink wrap plastic film, if desired.

Another variation is to utilize two battery trays, one for holding the bottom of the cell batteries, and the second for covering the top of the cell batteries. In this configuration, the flat bottom of one or either of the base surfaces might have a pattern of holes arranged thereon to accommodate the positive battery terminals of the cell batteries.

Also, the height of each of the base surfaces might be approximately one-half the height of the cell batteries, to provide for a complete enclosure when using two battery trays. Other variations of the base height are of course possible.

Figure 6:
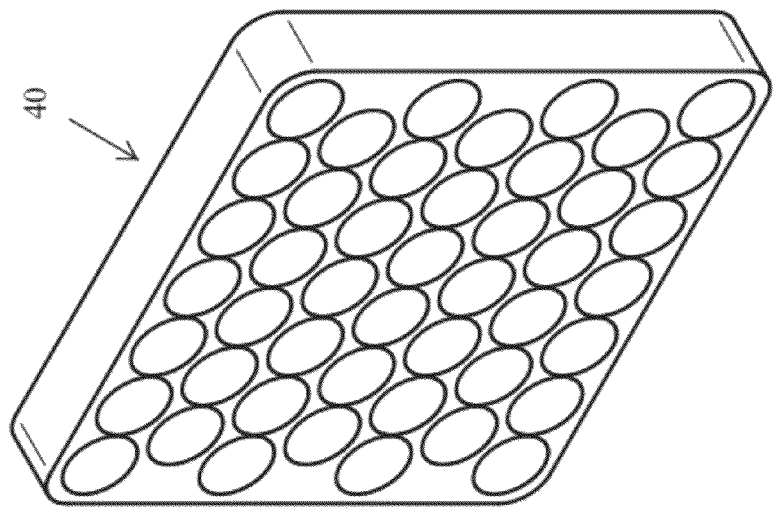
FIG. 6 shows front, perspective and cross-sectional side views of a hexagonal packing embodiment.
Figure 6:
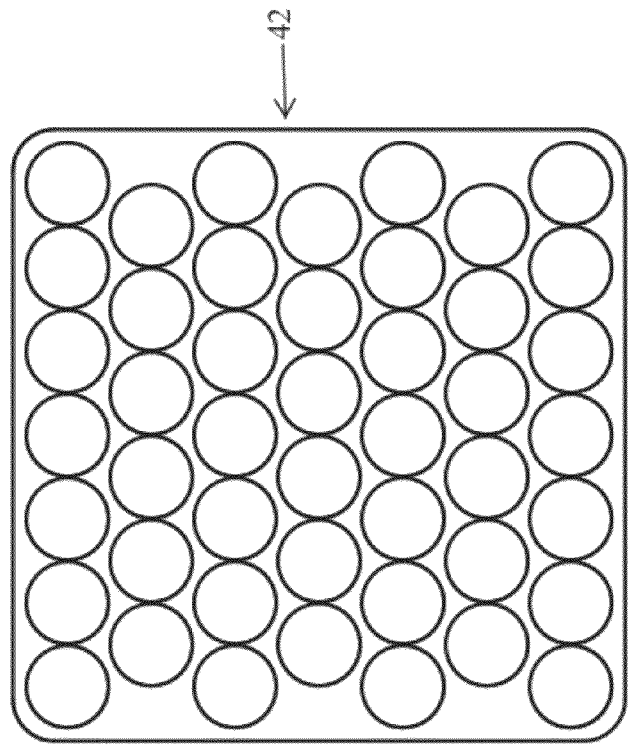
Figure 6:
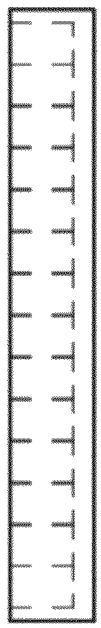
Figure 7:
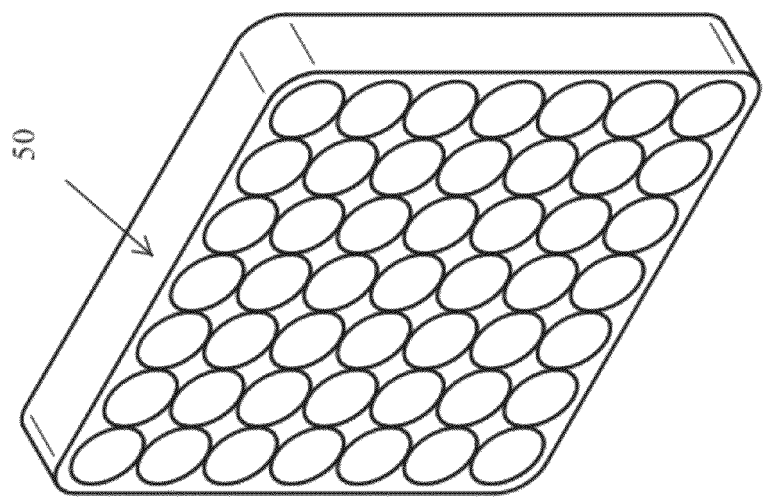
FIG. 7 shows front, perspective and cross-sectional side views of a square packing embodiment.
Figure 7:
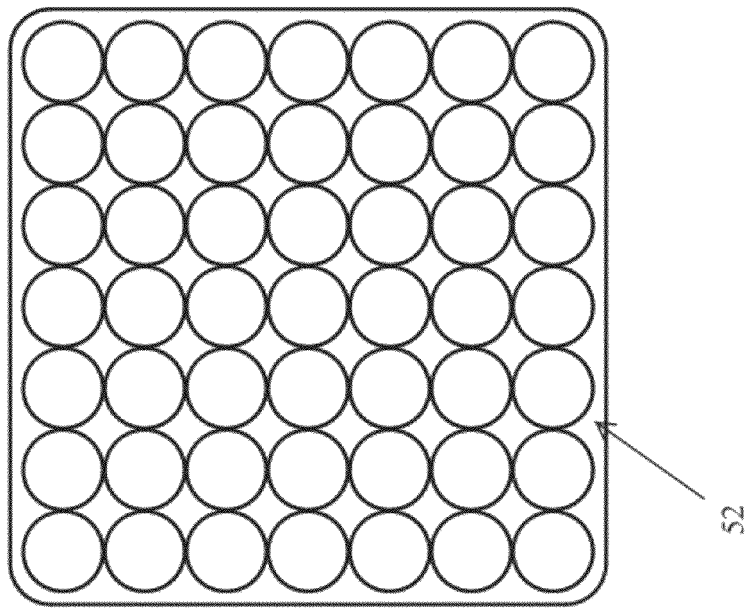
Figure 7:
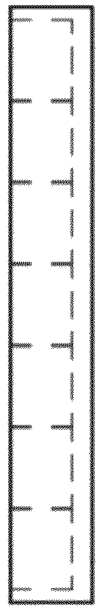
Figure 8:
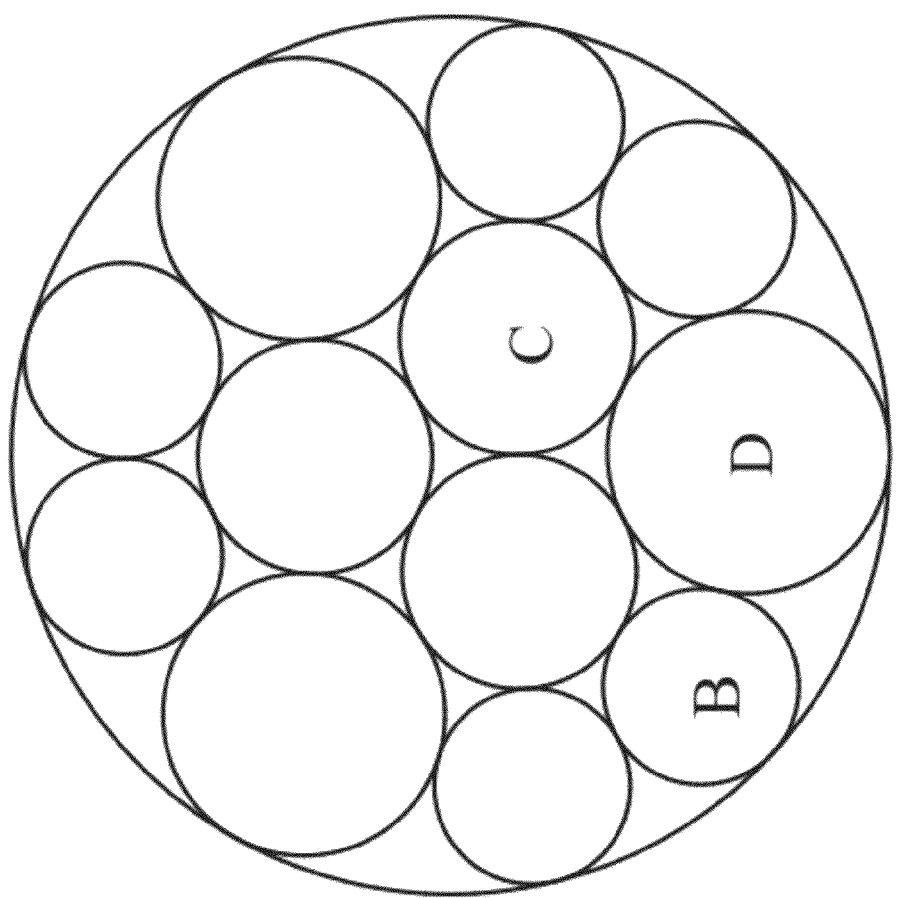
FIG. 8 shows a front view of an embodiment with different diameters.

FIGS. 6-8 show other embodiments of the present invention with different types of base structures according to the present invention. FIGS. 6A-6C show a configuration 40 with front, perspective and side views, with hexagonal packing FIGS. 7A-7C show a configuration 50 with front, perspective and side views, with square packing FIG. 8 shows an embodiment with different diameters of cylindrical cavities, for holding cell batteries of different sizes, such as size "B", "C", and "D" batteries. These embodiments can utilize circle packing algorithms allowing for circular packing, hexagonal packing or square packing, as shown in FIGS. 4-8.

For some configurations, the cylindrical cavities arranged at the edge or periphery of the base will typically have cylindrical support surfaces along the entire periphery for the particular base structure, such as edges 42 and 52 in FIGS. 6 and 7. The interior of the base support will have at least some of the adjacent tangential cylindrical cavity surfaces forming in combination a support for the respective cell battery, such as shown in FIGS. 4-8

It should be apparent from the round, hexagonal and square configurations shown in FIGS. 4-8 that the cylindrical cavity arrangement of the present invention, utilizing a circle packing algorithm, can be designed such that a plurality of cylindrical cavities are formed within a base support structure where adjacent cavities have interstitial cylindrical wall riser structures to hold or support cylindrical objects such as cell batteries.

Arrangements with different size cavity diameter dimensions are possible, along with different base height dimensions. For instance, the interstitial risers can be designed to have adjacent cavities which are tangential in configuration, yet still provide proper support for holding cylindrical objects such as cell batteries. With base heights of approximately half the height of a cell battery, two base supports can be designed to stack on one another and fastened together, much like a sandwich effect, for even more support for holding cell batteries, such as for transport and/or display.

For low volume production, the battery tray configuration or the manufacturing jig configuration of the present invention can be produced through various suitable processes, such as in layers by fused deposition modeling, stereolithography, 3-D printing, or other common machining processes.

For large volume production, the battery tray configuration can be produced by other suitable processes, such as injection molding, for example. It is apparent that the battery trays shown in FIGS. 4-8 could be the basis for forming a cavity mold in an injection molding process.

In such an injection molding process, heated plastic material can be forced into the cavity mold corresponding to the aspects of a battery tray configuration of the present invention. The plastic material cools and hardens to the configuration of the mold cavity. The resulting article of manufacture from such an injection molding process will have the desirable aspects of a battery tray holder for cell-type batteries as shown in FIGS. 4-8, and would be very suitable for large volume production for storage, shipping and display.

Other embodiments of the present invention will now be described in conjunction with FIGS. 9-15.

Figure 9:
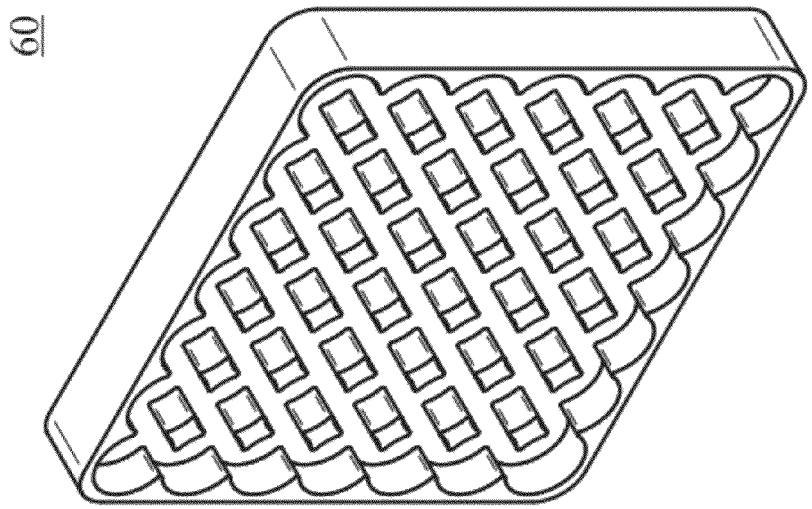
FIG. 9 shows a square packing embodiment with oversized holes.
Figure 9:
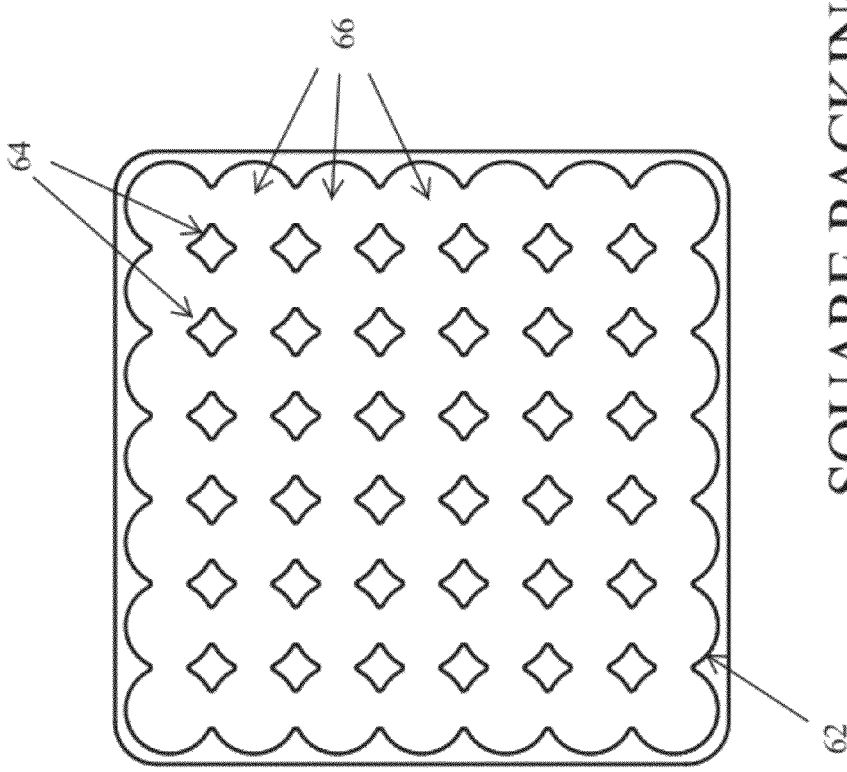
Figure 9:
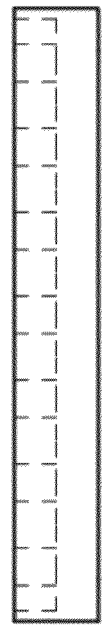

FIG. 9 shows a square packing embodiment 60 with oversized holes 66 to facilitate removal of a cell battery. In FIG. 9, the outer periphery 62 is formed as a series of cutouts which are slightly larger in diameter than the typical battery cell, which makes for easier removal of a battery cell from the battery tray. The embodiment 60 shown in FIG. 9 shows a uniform shape of the interstitial risers 64, in accordance with a selected circle packing algorithm. Other variations are of course possible.

Figure 10:
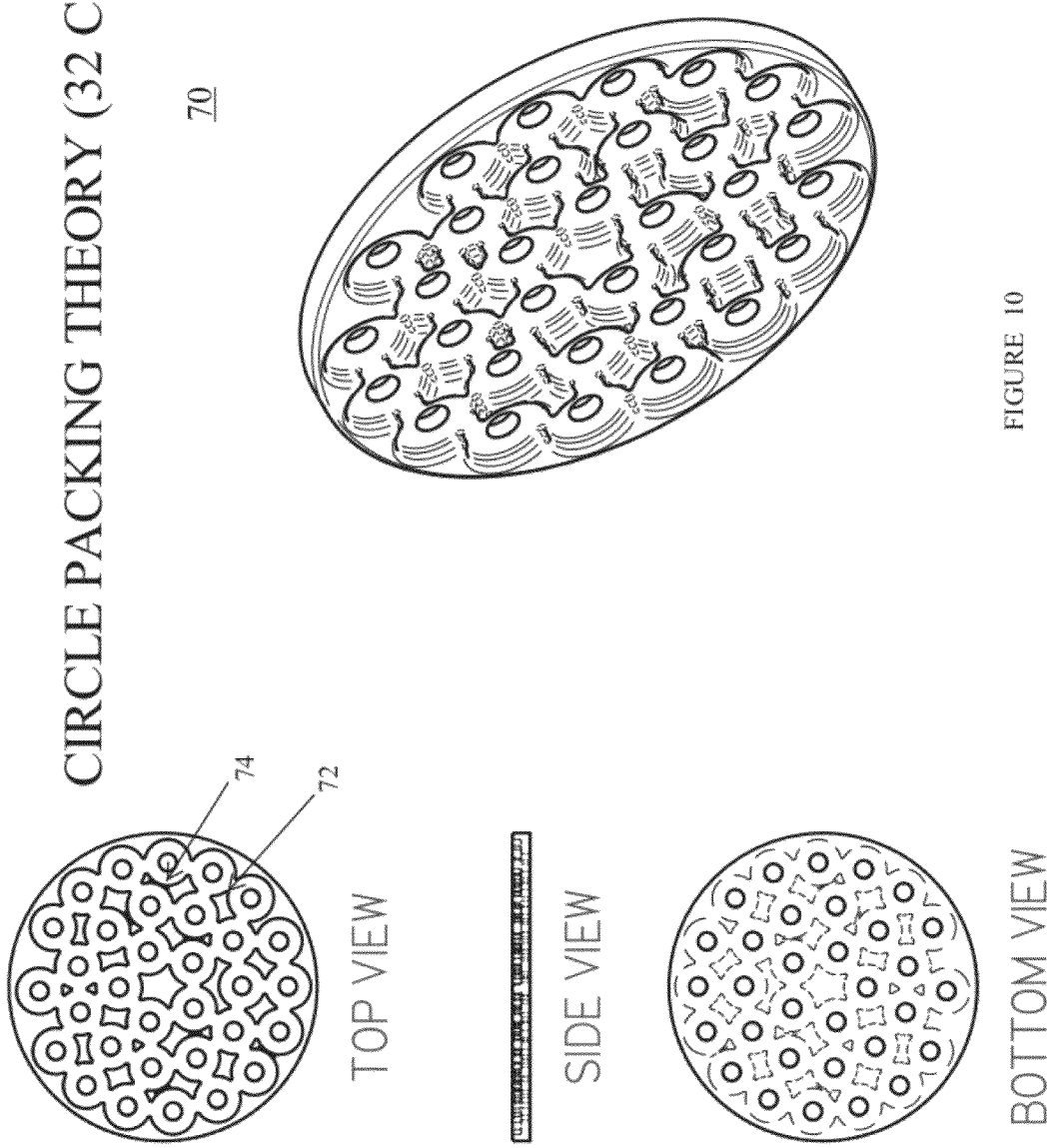
FIG. 10 shows an embodiment with 32 cells.

FIG. 10 shows an embodiment 70 with 32 cells, with top view, side view, bottom view and perspective view. The configuration of the interstitial risers 72, 74 shown in FIG. 10 are different when compared to the risers 64 shown in FIG. 9.

Figure 11:
FIG. 11 shows an embodiment of 32 cells with grayscale shading.
Figure 11:
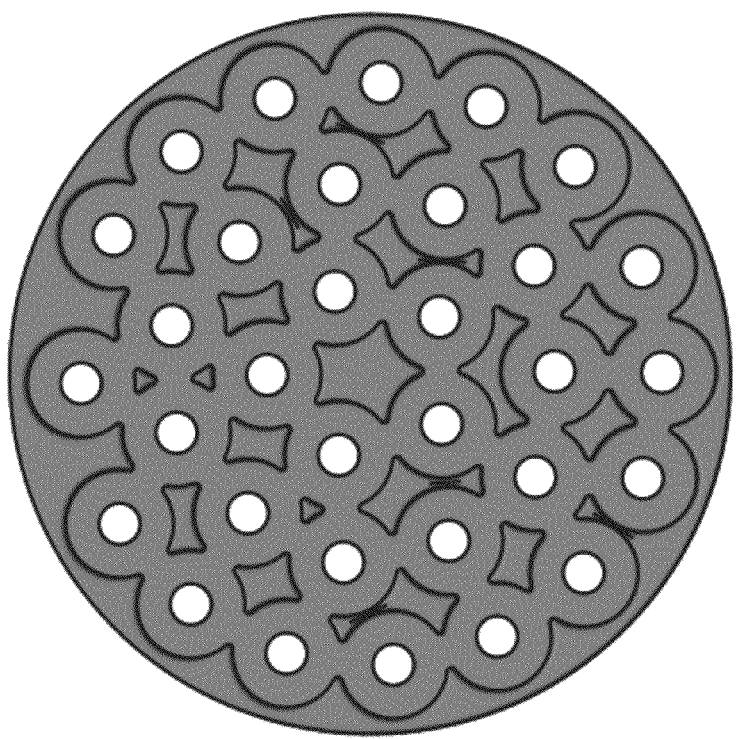
Figure 11:

FIG. 11 shows an embodiment of 32 cells with grayscale shading, including top view, side view and perspective view, to show another view of the present invention, and the different arrangements possible with the interstitial risers.

Figure 12:
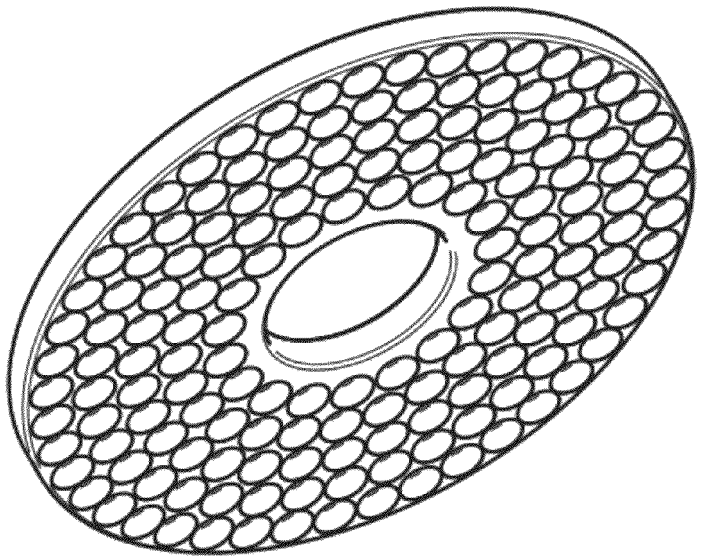
FIG. 12 shows an embodiment with concentric radial packing
Figure 12:
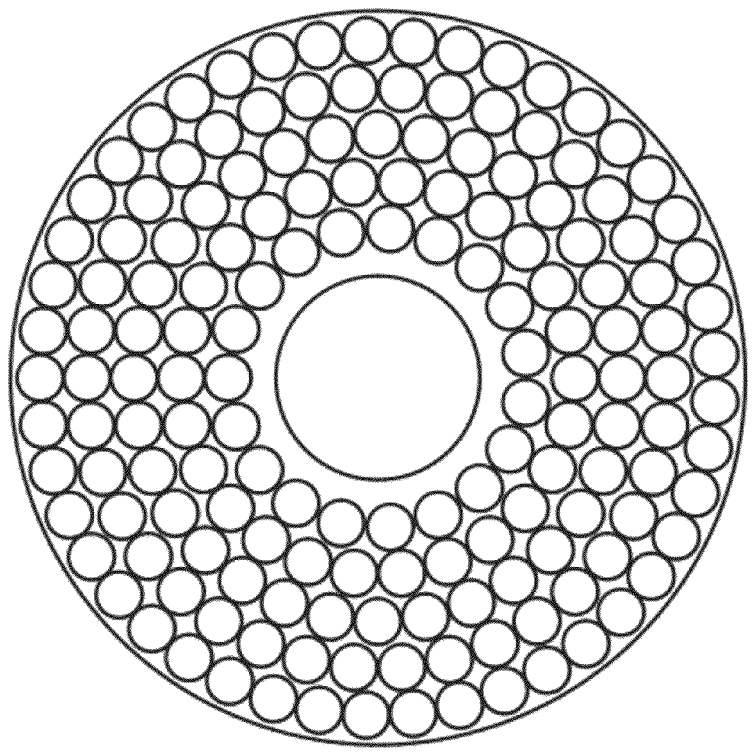
Figure 12:

FIG. 12 shows an embodiment with concentric radial packing for 160 cells, showing a top view, side view and a perspective view.

Figure 13:
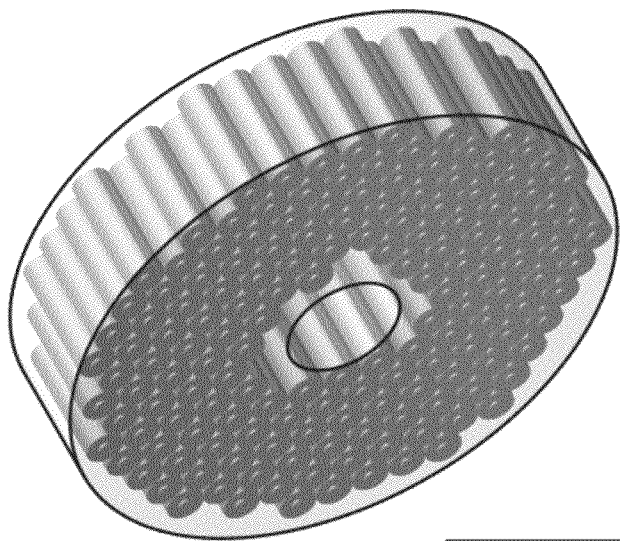
FIG. 13 shows an embodiment with an enclosed configuration.
Figure 13:
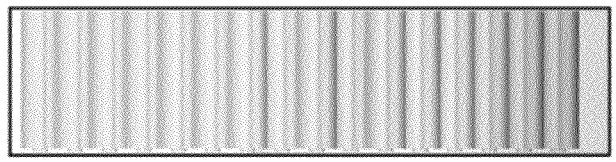
Figure 13:
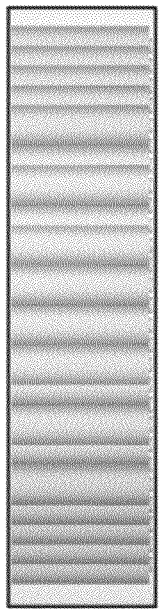
Figure 13:
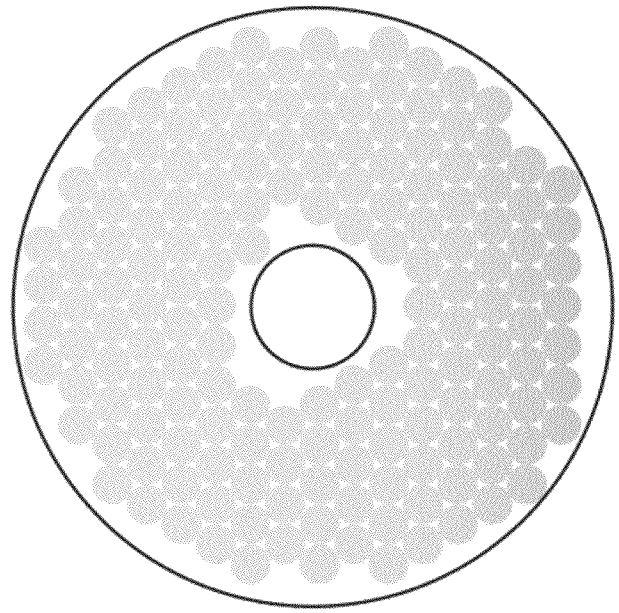

FIG. 13 shows an embodiment with a completely enclosed configuration, showing side views, top view and a perspective view.

Figure 14:
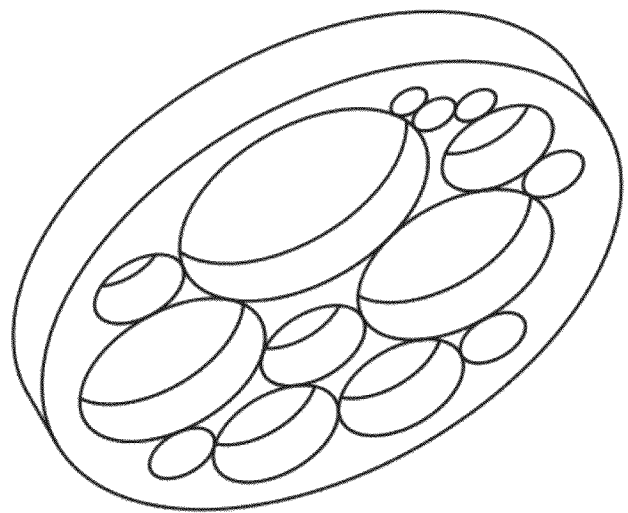
FIG. 14 shows an embodiment with different diameters.
Figure 14:
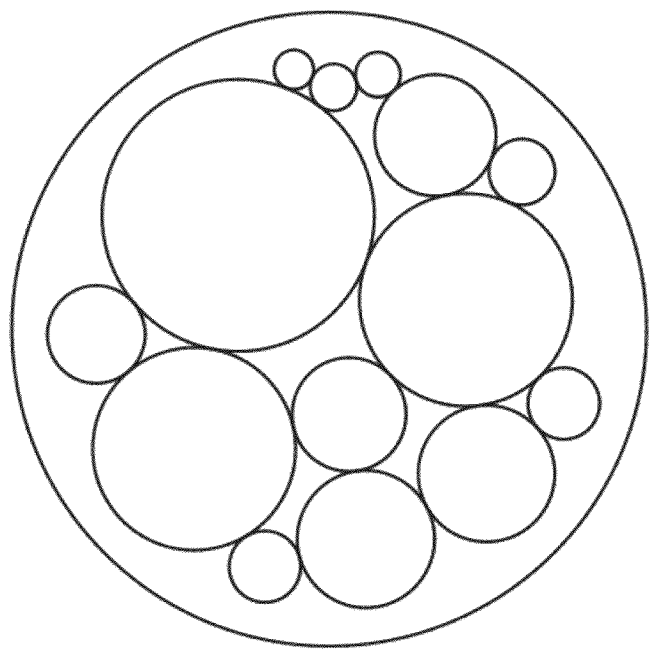
Figure 14:
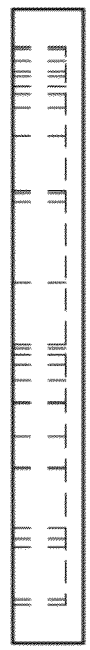

FIG. 14 shows another embodiment with different diameters, including a top view, side view and a perspective view.

Figure 15:
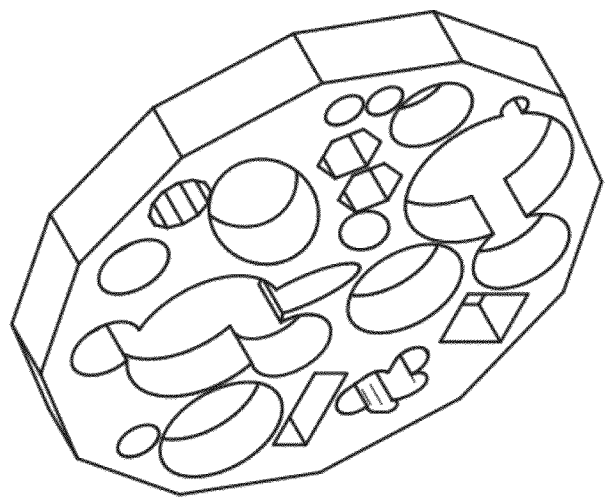
FIG. 15 shows an embodiment with different geometrical shapes.
Figure 15:
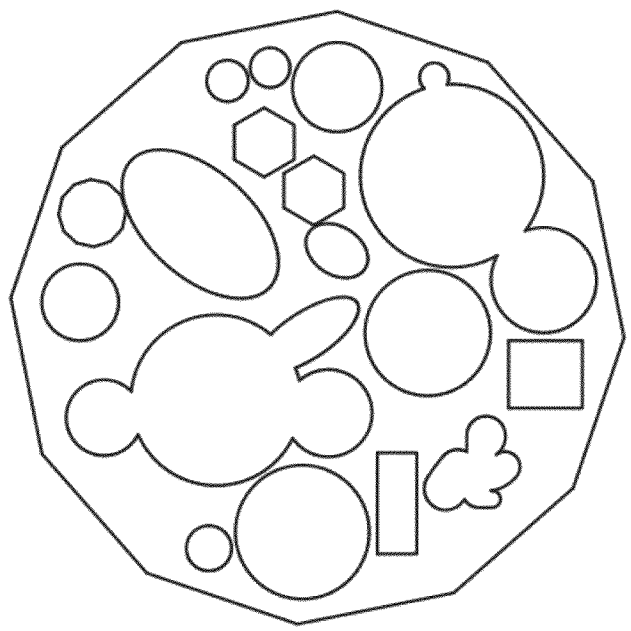
Figure 15:

FIG. 15 shows an embodiment with different geometrical shapes, including a top view, side view and a perspective view.

FIGS. 16-20 show additional perspective views of various embodiments of battery tray holders of the present invention.

Figure 16:
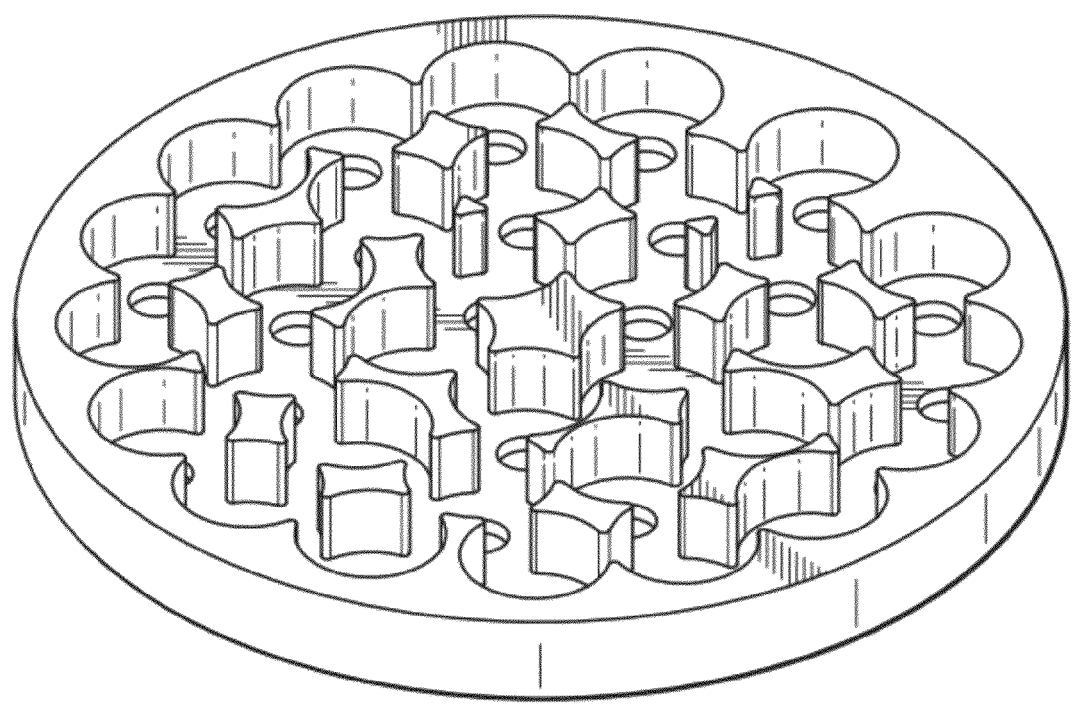
FIG. 16 shows a perspective view of a battery tray holder with a round base.

FIG. 16 shows a perspective view of a battery tray holder with a round base with holes formed within the bottom surface of the base.

Figure 17:
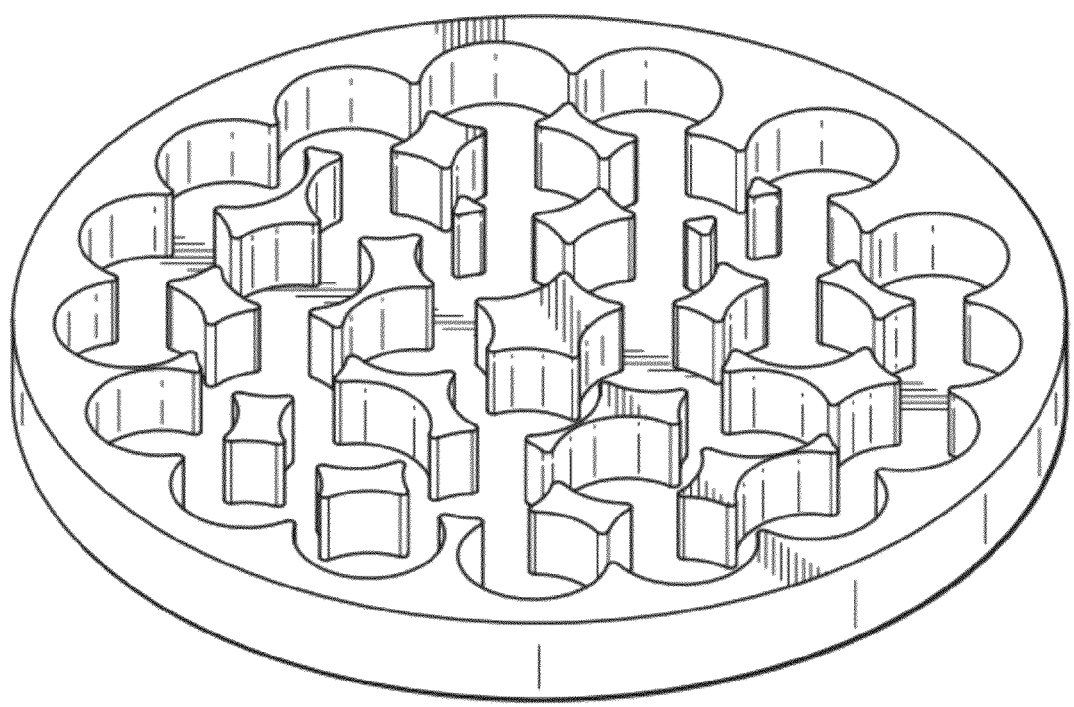
FIG. 17 shows another perspective view of a battery tray holder with a round base.

FIG. 17 shows another perspective view of a battery tray holder with a round base but without any holes in the bottom surface of the base.

Figure 18:
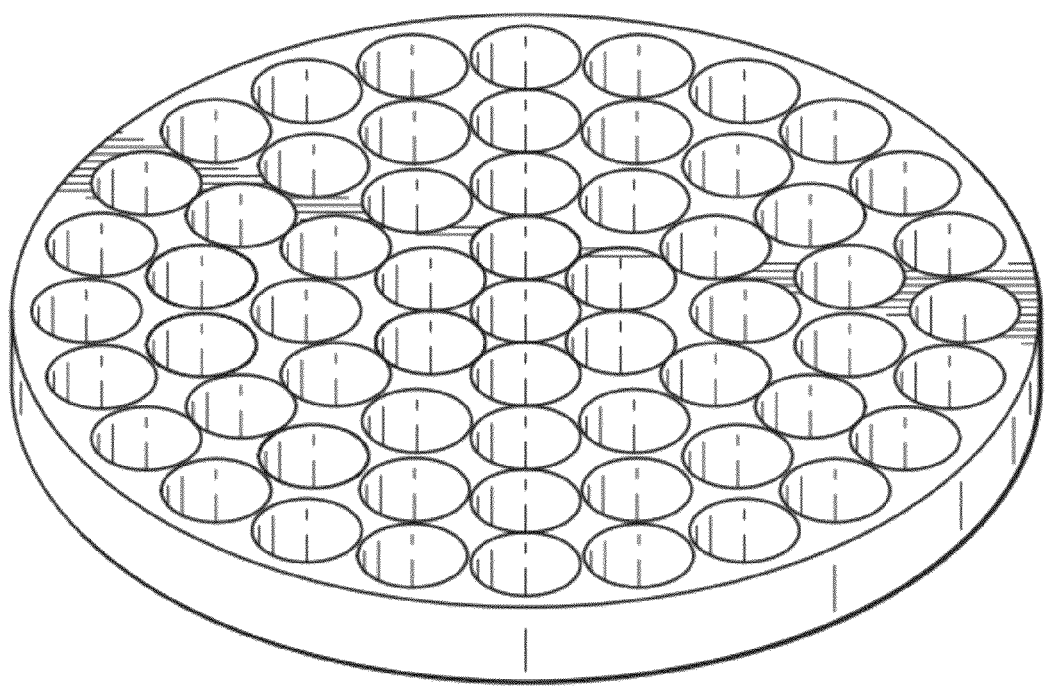
FIG. 18 shows another perspective view of a battery tray holder with a round base.

FIG. 18 shows another perspective view of a battery tray holder with a round base with complete cylindrical cavities contained with the support base, as contrasted with FIGS. 16 and 17.

Figure 19:
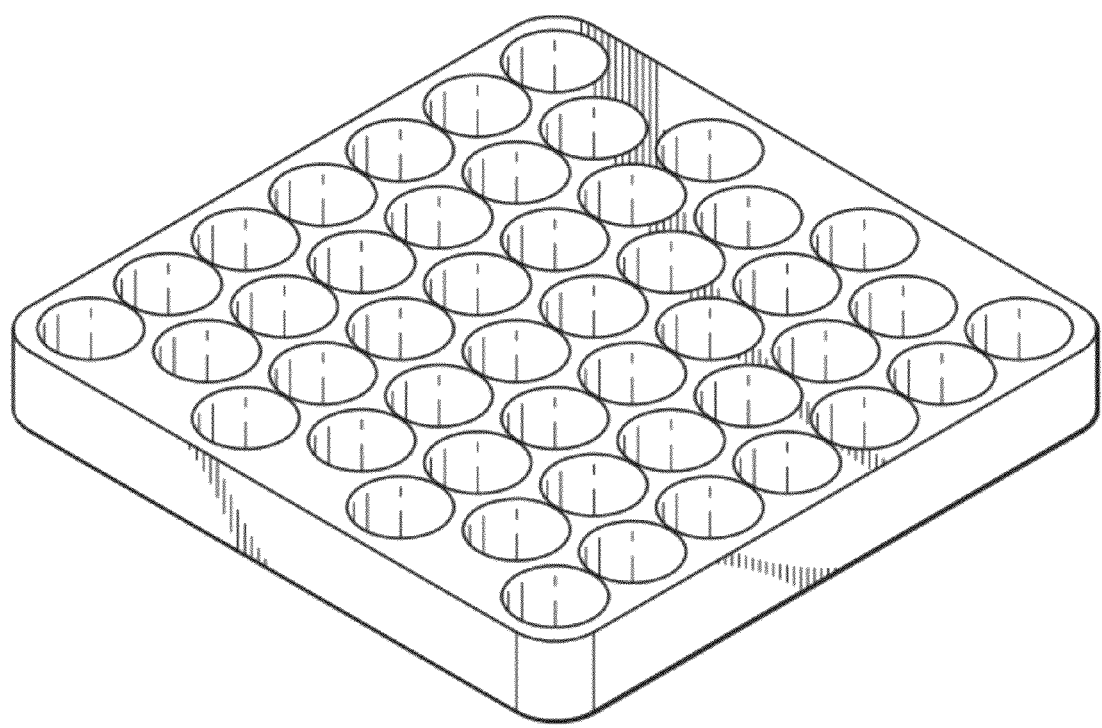
FIG. 19 shows a perspective view of a battery tray holder for a hexagonal configuration.
Figure 20:
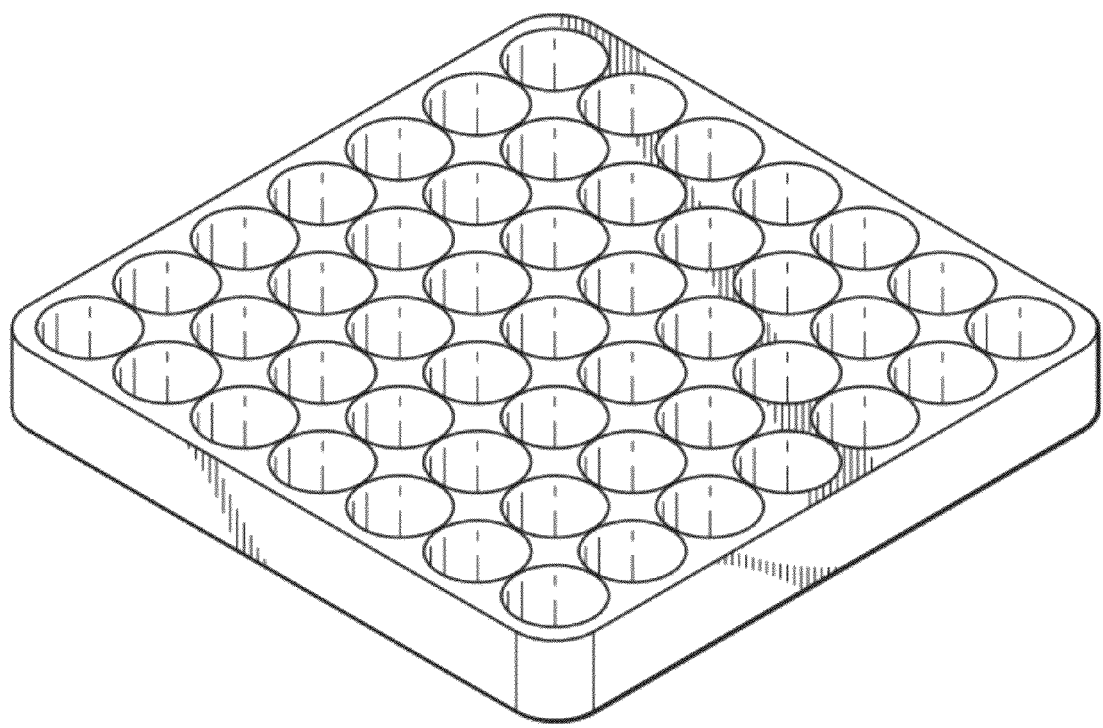
FIG. 20 shows a perspective view of a battery tray holder for a square configuration.

FIG. 19 shows a perspective view of a battery tray holder for a hexagonal packing configuration and FIG. 20 shows a perspective view of a battery tray holder for a square packing configuration.

Figure 21:
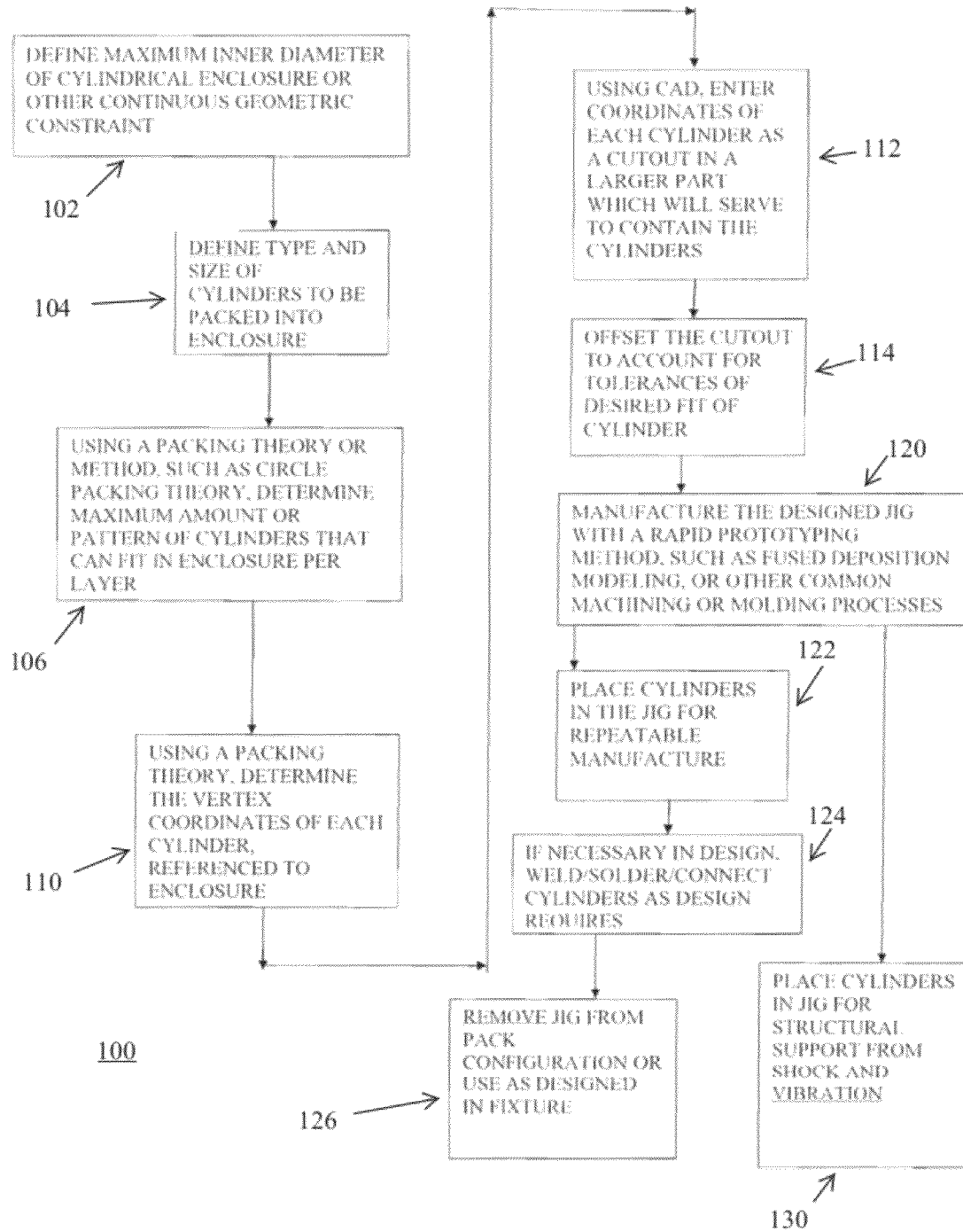
FIG. 21 shows a detailed flowchart illustrating one method of the present invention.

FIG. 21 shows a detailed flowchart illustrating one method of the present invention.

Referring now to FIG. 21, a method 100 showing the series of steps according to one embodiment of the present invention is now described in more detail.

In FIG. 21, the first step 102 defines the maximum inner diameter of the cylindrical enclosure or other continuous geometric constraint. The cylindrical enclosure could be base supports 12 or 34, for example, shown in FIGS. 4 and 5. It should be understood that the method could be applied to other base support structures, such as a rectangular or square base 40 or 50 shown in FIGS. 6 and 7, or some other desired enclosure.

The next step 104 defines the type and size of cylinders to be packed into the enclosure. In one embodiment, the enclosure could be a battery tray for holding cell batteries, such as "D" cell batteries. The battery tray 12 shown in FIG. 4 can hold up to 32 "D" cell batteries, as an example.

Using a packing theory or method, such as circle packing theory, the next step 106 determines the maximum amount or pattern of cylinders that can fit in the enclosure per layer (the enclosure can be manufactured in layers, such as by a 3-D printer).

Using a packing theory, the next step 110 determines the vertex coordinates of each cylinder, referenced to the enclosure. FIG. 1 shows circle arrangements using a circle packing theory with 192 circles (radius=0.659, ratio=15.169, density=0.834, and contacts=384). FIG. 2 shows circle arrangements with 36 circles (radius=0.148, ratio=6.747, density=0.791, contacts=66).

Using CAD at step 112, the method 100 enters the vertex coordinates of each cylinder as a cutout in a larger part which will serve to contain the cylinders. FIG. 3 shows a CAD sketch of point cloud and cell arrangements for 37 cells.

At step 114, the method offsets the cutout to account for tolerances of the desired fit of each cylinder, such as the fit for cell batteries within a battery tray such as shown in FIG. 4.

At step 120, when the present invention is used as a manufacturing jig, the method 100 manufactures the designed jig with a rapid prototyping method, such as fused deposition modeling, or other common machining or molding processes.

At step 122, the method 100 places cylinders (e.g., cell batteries) in the jig for repeatable manufacture. At step 124, if necessary or desired, the method 100 welds/solders/connects cylinders as the design requires. This step would be, for example, when cell batteries are configured in a manufacturing jig, and the positive and negative terminals are welded/soldered/connected into a desired configuration for use.

In FIG. 21, the method 100 at step 126 removes the jig from pack configuration or use as designed in the fixture.

An alternative from step 120 is to place the cylinders in the jig for structural support from shock and vibration, at step 130.

From the above description, it is apparent that various techniques may be used for implementing the concepts of the present invention without departing from its scope. The described embodiments are to be considered in all respects as illustrative and not restrictive. It should also be understood that system is not limited to the particular embodiments described herein, but is capable of many embodiments without departing from the scope of the claims.

What is claimed is:

1. A method for forming a battery tray for holding cylindrical cell batteries comprising the steps of:
    forming a base support having a generally flat bottom surface; and
    forming a plurality of adjacent cylindrical cavities formed within the base support using a circle packing algorithm to form the cylindrical cavities, where the adjacent cavities each have at least some interstitial cylindrical riser wall structures formed with a predetermined height to hold the cylindrical cell batteries.

2. The method of claim 1 wherein the base support is a circular base.

3. The method of claim 1 wherein the base support is a rectangular base.

4. The method of claim 1 wherein the cavities are formed in a circular configuration.

5. The method of claim 1 wherein the cavities are formed in a square configuration.

6. The method of claim 1 wherein the cavities are formed in a hexagonal configuration.

7. The method of claim 1 wherein the cavities have equal diameters.

8. The method of claim 1 wherein the cavities have different diameters.

9. The method of claim 1 wherein the cavities are layered cavities.

10. The method of claim 1 wherein at least some of the cavities are tangential to one another.

11. The method of claim 1 wherein the predetermined height is approximately one-half the height of the cell batteries.

12. A method for forming a device for holding cylindrical objects comprising
    forming a base support having a generally flat bottom surface; and
    forming a plurality of cylindrical cavities formed within the base support using a circle packing algorithm to form the maximum number of cavities within the base support, where adjacent tangential cavities have interstitial cylindrical wall structures formed with a predetermined height to support holding of the cylindrical objects, each of the interstitial circular wall structures formed by at least some cylindrical surfaces of the adjacent tangential cavities.

13. A method for manufacturing jig for holding cylindrical objects comprising
    forming a generally circular base support structure having a generally flat bottom surface;
    forming a plurality of cylindrical cavities formed within the base support using a circle packing algorithm to form the maximum number of cavities, each having generally equal diameters within the base structure where adjacent cavities form interior circular support wall structures support the cylindrical objects.

14. A method for forming a device having cylindrical enclosures comprising:
    defining the maximum inner diameter of a cylindrical enclosure or other continuous geometric constraint;
    defining the type and size of cylinders to be packed into the enclosure;
    using a circle packing theory, determining the maximum amount or pattern of cylinders that can fit in the enclosure per layer;
    using the packing theory, determining the vertex coordinates of each cylinder, referenced to the enclosure;
    using a CAD (computer aided design), entering the coordinates of each cylinder as a cutout in a larger part which will serve to contain the cylinders;
    offsetting the cutout to account for tolerances of desired fit of cylinder;
    manufacturing the designed jig with a rapid prototyping method, such as fused deposition modeling, or other common machining or molding processes.

15. The method of claim 14 further comprising:
placing cylinders in the jig for repeatable manufacture.

16. The method of claim 15 further comprising:
welding, soldering or connecting cylinders as the design requires.

17. The method of claim 16 further comprising:
removing the jig from pack configuration or use as designed in the fixture.

18. The method of claim 17 further comprising:
placing the cylinders in the jig for structural support from shock and vibration.

* * * * *